United States Patent [19]

Sakamoto et al.

[11] Patent Number: 5,324,574
[45] Date of Patent: Jun. 28, 1994

[54] BIAXIALLY STRETCHED POLYESTER FILM

[75] Inventors: Seiji Sakamoto; Chikakazu Kawaguchi; Takahashi Harada, all of Yokohama, Japan

[73] Assignee: Diafoil Hoechst Company, Ltd., Tokyo, Japan

[21] Appl. No.: 872,397

[22] Filed: Apr. 23, 1992

[30] Foreign Application Priority Data

Apr. 26, 1991 [JP] Japan .................................. 3-097300

[51] Int. Cl.$^5$ ............................................. B29K 67/00
[52] U.S. Cl. .................................... 428/220; 428/327; 428/480; 428/483
[58] Field of Search ............... 428/220, 219, 327, 480, 428/483, 910

[56] References Cited

U.S. PATENT DOCUMENTS 4,590,119 5/1986 Kawakami et al. .................. 428/216
5,100,719 3/1992 Endo et al. ............................ 428/213

FOREIGN PATENT DOCUMENTS 0372423 6/1990 European Pat. Off. .

OTHER PUBLICATIONS

Patent abstract, Database WPI, Derwent Publications Ltd., AN 80-64919C.

Primary Examiner—D. S. Nakarani
Attorney, Agent, or Firm—Foley & Lardner

[57] ABSTRACT

A novel biaxially stretched polyester film having excellent transparency and slipperiness is disclosed. The biaxially stretched polyester comprises a polyester composition which exhibits a film haze of not more than 1% after it is made into a film having a thickness of 100 μm and 50–500 ppm on the basis of the weight of monodispersed cross-linked high polymer particles having an average particle diameter of 0.8–1.4 μm and exhibits a deformability of 1.2–5.0 in a biaxially stretched polyester film.

19 Claims, No Drawings

BIAXIALLY STRETCHED POLYESTER FILM

FIELD OF THE INVENTION

The present invention relates to a biaxially stretched polyester film having excellent transparency and slipperiness. More particularly, the present invention relates to a polyester film suitable for use in preparation of printing plates, X-ray photography, microfilms, electronic photography, vapor deposition of metals, etc.

BACKGROUND OF THE INVENTION

One of the properties required for the polyester film is transparency. However, simultaneously, slipperiness, which is requisite for easiness in handling of the polyester film, is required. As means for providing the film with such characteristic, it is known to provide a slippery layer on the surface thereof by coating or to incorporate a lubricant in the polyester. These measures are not satisfactory from the viewpoint of reliability and manufacturing cost. Therefore, up to now, the problem has been tried to be solved by incorporating fine particles in monolayer films and conditions of the suitable particles have been searched for. Use of amorphous silica is disclosed in Laying-Open Publication Sho 61-24978 for instance. An attempt to reduce the degree of planar orientation in film making is described in Laying-Open Patent Publication No. Sho 61-293832.

Even by these measures, however, it is difficult to satisfy the today's strict demand. When such silica particles are used, transparency of film is apt to be impaired by voids formed around the incorporated particles and the film cannot be free from a defect called "frosting" which is caused by a wide particle size distribution of used silica. The reduction of degree of planar orientation is inherently insufficient in improvement of slipperiness and it requires a film composition which reduces the speed of film making, which invites rise in manufacturing cost.

In view of the above-described situation, we conducted an extensive study in search of a polyester film having excellent transparency and slipperiness, we have found that a biaxially stretched film which comprises a matrix of transparent polyester and particles of a specific cross-linked high polymer incorporated in the former are provided with excellent transparency and slipperiness.

DISCLOSSURE OF THE INVENTION

That is, the gist of the present invention resides in a biaxially stretched film comprising a polyester composition which exhibits a haze of not more than 1% after it is made into a biaxially stretched film having a thickness of 100 $\mu$m and 50-500 ppm on the basis of the polyester composition of mono-dispersed particles of a cross-linked high polymer incorporated in the former, said particles having an average particle diameter of 0.8-1.4 $\mu$m and a degree of deformability in said biaxially stretched polyester film of 1.2-5.0.

Now the invention will be described below in detail.

The term "polyester" as used in this specification means a polyester containing not less than 90 mol % of ethylene terephthalate units or ethylene 2,6-naphthalate units.

The term "polyester film" as used in this specification means a film prepared from such a polyester and stretched at least in one direction. Such polyester films can be prepared by any known method. For instance, such a film can be prepared by melt-extruding polyester into a sheet at 270°-320° C., cooling it to 40°-80° C. to solidify it as an amorphous sheet and sequentially or simultaneously stretching in two directions by a factor of 4-20 in sectional area at 80°-160° C. as disclosed in Japanese Patent Publication No. Sho 30-5639. Longitudinal or transversal stretching of the film can be carried out in one step or in multiple steps. When the film is stretched in multiple steps a heating zone can be provided in the stretching apparatus for relaxation of orientation. Or the biaxially stretched film can be stretched again before it is subjected to the heat treatment. This stretching can be carried out in any one direction or in two directions.

The polyester composition which exhibits a film haze of 1% or less after being made into a film having a thickness of 100 $\mu$m can be obtained by the method described in page 2, column 3, line 41 through page 3, column 5, line 1 of Japanese Patent Publication No. Sho 61-2497.

That is to say, the polyester composition is usually prepared by copolymerizing dimethyl terephthalate and ethylene glycol and a third comonomer if desired in the presence of a catalyst such as a compound of calcium, manganese, zinc, cobalt, magnesium, etc. In this case a phosphorus compound should preferably be used for improvement of thermal stability of the resulting polyester. Or the polyester composition can be obtained by polymerizing the transesterification product of terephthalic acid and ethylene glycol, and a third comonomer if desired.

When the polyester is prepared via transesterification, the preferred catalyst is a combination of a calcium compound and a phosphorus compound or a combination of a manganese compound and a phosphorus compound. The ratio of the phosphorus compound to the metal compound is 0.6-3 moles, preferably 0.7-2 moles per 1 mole of the metal compound. If the ratio is less than 0.6 mole, the haze of the resulting biaxially stretched film of the polyester composition having good transparency and a film haze of not more than 1% will not be obtained. On the contrary, if the ratio is in excess of 3 moles, the polymerization rate is too low and thus such a condition will not be advantageously employed in industry.

The transparent polyester composition for the present invention can be obtained by a direct esterification without using an esterification catalyst. In this case the polyester composition can be obtained without using the esterification catalyst. In this case, although a polyester for use in the present invention can be obtained, it is desirable to add a small amount of a phosphorus compound to the reaction mixture in the transesterification in order to obtain a polyester having good thermal stability. When a calcium compound or other metal compound are added, it is desirable to add 0.6-3 moles, preferably 0.7-2, of a phosphoric acid. Thus the method provides a film very transparent but having little slipperiness.

The method disclosed above relates to polyethylene terephthalate composition but a composition, which has little slipperiness but excellent transparency can be obtained by using naphthalene-2,6-dicarboxylic acid or an ester thereof instead of terephthalic acid or an ester thereof.

It is already known by Japanese Patent Publication Sho 59-5216, etc. that particles of a specific cross-linked polyester is used in order to provide the polyester film with slipperiness. We extensively studied the cause-and-effect relation between characteristics of the film and characteristics of the particles used and found that desired film characteristics can be obtained when particles having characteristics within some specific scope are used. Thus we completed this invention.

The particles of cross-linked high polymer used in the present invention are mono-dispersed. That is, the particle size distribution thereof must be sharp. The parameter representing the sharpness r (defined hereinafter) usually 1.4 or less, preferably 1.3 or less. When the parameter is larger than 1.4, "frosting" of the film becomes remarkable.

The average particles diameter of the cross-linked high polymer particles must be within the range of 0.8–1.4 μm. When it is less than 0.8 μm, windability during the film making is poor and handling in processing is difficult. When this value is larger than 1.4, the random reflection of the film surface is remarkable and thus the transparency is inferior and the frosting is also remarkable.

The particles used in the present invention should preferably be as spherical as possible before the film is stretched from the viewpoint of slipperiness and isotropy of the film. That is, the aspect ratio (defined in detail hereinafter), that is, the ratio of the maximum diameter and the minimum diameter, should preferably be 1.0–1.1. This is practically regarded 1.

One of the characteristics of the present invention is that particles which satisfy the above diameter conditions and further are deformable to some extent during the stretching work. That is, the deformability represented by the aspect ratio of the maximum diameter and the minimum diameter of the cross-linked high polymer particles to be used should be 1.2–5.0. When the deformability is less than 1.2, voids are formed around the particles, which deteriorates transparency of the film. When the deformability is in excess of 5.0, slipperiness of the film is not improved.

In order that the spherical particles are deformed to the above-described extent, a suitable combination of ease of deformation of the particles per se and stretching conditions is required.

For easily deformable particles, rather moderate stretching conditions are required. Those particles are deformed to a large extent even if the film is stretched at a rather high temperature at a low stretching ratio within the above-described stretching conditions. On the contrary, for the cross-linked high polymer particles having rather poor deformability, stronger stretching stress is required in order to cause desired deformation of particles as desired in the present invention.

In the present invention, cross-linked high polymer particles usually having a particle aspect ratio of 1.0–1.1 are deformed to a deformability of 1.2–5.0, preferably 1.3–4.0 and more preferably 1.3–3.0. For this purpose, the following particles are suitably used.

Typical examples of the cross-linked high polymer particles are fine high polymer particles having cross-linked structure of a proper degree, such as a copolymer of (A) a mono-vinyl compound having only one aliphatic unsaturated bond and (B) a cross-linker compound having two or more aliphatic unsaturated bonds. Such copolymers can have groups reactable with polyester.

Examples of compound (A), which is one component of the copolymer, are acrylic acid, methacrylic acid and methyl or glycydyl ester thereof, maleic anhydride and alkyl derivatives thereof, vinyl glycidyl ether, vinyl acetate, styrene, alkyl-substituted styrene, etc. Examples of compound (B) are divinyl benzene, divinylsulfone, ethylene glycol dimethacrylate, etc. More than one of compound (A) and compound (B) can be used and ethylene and nitrogen-containing compounds can be copolymerized therewith.

In the present invention, it is necessary to select the composition of the high polymer, especially compound (A) so that the glass transition temperature of the cross-linked polymer is low, i.e., not higher than 95° C. preferably 85° C. and more preferably 75° C.

That is, it is desirable to introduce a compound which depresses the glass transition temperature to not higher than 95°, preferably 85° C. and more preferably 75° C., in the copolymer Examples of such a compound are esters of acrylic acid and a $C_{2-3}$ alkyl, methacrylic acid and a $C_{6-12}$ alkyl and a styrene derivative having a $C_{6-12}$ alkyl substituent at the p-position, although not limited to these only.

Although the degree of cross-linking of the particles has great influence on the deformability of the particles, relatively lower degree of cross-linking is preferred insofar as the heat resistance of the particles is sufficient. Specifically, the content of component (B) in the copolymer is preferably 0.5–20 wt %, preferably 0.7–15 wt % and more preferably 1–10 wt %.

In the present invention, the incorporated particles are organic and therefore have good affinity to polyester and are suitably deformed by stretching stress. Therefore, the resulting film has improved transparency, which is one of the characteristics of the present invention.

In the present invention, the ratio of incorporation of such particles in polyester is 50–500 ppm, preferably 100–300 ppm. When the content is less than 50 ppm, the slipperiness is not satisfactorily improved. When more than 500 ppm of the particles are incorporated, the resulting film is undesirable in transparency and frosting.

In the present invention, the cross-linked high polymer particles can be incorporated in polyester by any known method and not specifically limited.

For instance, the particles can be added to the reaction mixture in a step during the preparation of polyester, preferably in the form of a slurry in ethylene glycol after the esterification or the transesterification and before the polycondensation or the particles can be directly blended with polyester chips.

In accordance with the present invention, polyester film having excellent properties which have not been achieved in the polyester film can be prepared by incorporating specific cross-linked high polymer particles which can deform following the deformation of the film. However, a small amount of other particles such as kaolin, talc, silicon dioxide, calcium carbonate, titanium dioxide, zeolite, aluminum oxide, etc. can be incorporated within the gist of the present invention. Further, weathering resistance improver, anti-static agent, lubricant, light shielding agent, antioxidant, optical brightener, dye, etc. can be added.

Of the polyester films of the present invention, those having a thickness of 10–200 μm and a film haze of not more than 3%, preferably 2%, are especially useful.

In the present invention, when stretching with low orientation is employed, films provided with especially excellent transparency and slipperiness can be obtained.

That is, film making conditions are selected so that the refractive index in the direction perpendicular to the film surface is small, that is, not smaller than 1.492, preferably 1.493–1.502 in the case of polyethylene terephthalate and not smaller than 1.503–1.512 in the case of polyethylene 2,6-naphthalate.

The resulting film of the present invention can be coated with a layer for promoting slipperiness, antistatic property, adhesibility, etc.

SPECIFIC DISCLOSURE OF THE INVENTION

The invention will now be illustrated by way of working and comparative examples. However, the present invention is not limited to these working examples only insofar as the gist of the invention is not trespassed. The term "parts" used in the examples means "parts by weight".

Methods of measurements employed in the present invention are as follows.

(1) Average Particle Diameter

Particles are observed under a scanning electron microscope and the maximum diameter and the minimum diameter of each particle were measured and the arithmetic average of the two was taken as the average diameter of one particle. The average particle diameter of a group of particles means the particle diameter at the point of 50% in diameter distribution of equivalent spheres.

(2) Sharpness in Particle Diameter Distribution (r)

Particle diameter distribution was determined in the same manner as in the determination of average particle size. In the particle diameter distribution, the amount (weight) of the particles was integrally summed up from the large size end. Sharpness in particle diameter distribution (r) was calculated in accordance with the following definition.

$$r = \frac{\text{(particle diameter when the integral sum is 25\%)}}{\text{(particle diameter when the integral sum is 75\%)}}$$

Distribution is sharper as the r value is closer to 1.

(3) Aspect Ratio of Particle

Particles to be incorporated in polyester were observed under a scanning electron microscope and the maximum diameter and minimum diameter were determined and the aspect ratio was calculated for each particle. At least, Measurement and calculation were carried out for at least 100 particles and average was taken as aspect ratio.

(4) Degree of Deformation

A small piece of film was embedded in epoxy resin and cut in the longitudinal direction of the film. The cross section was observed and the maximum and minimum diameter of at least 100 particles existing within 5 μm from the surface were measured. The arithmetic average thereof was taken as degree of deformation.

(5) Winding Operability

Polyester film was wound on a master roll and slit into a predetermined width and the slit film was wound up. The condition of wound-up roll was observed and rated as follows.

O=No wrinkle observed on the wound-up roll and edge regular.
Δ=Slight wrinkle observed on the wound-up roll and edge regular.
X=Considerable wrinkle observed on the wound-up roll and edge irregular.

(6) Film Haze

Turbidity of film was measured using a turbidimeter NDH-20D manufactured by Nippon Denshoku Kogyo K. K. in accordance with JIS-K6714.

(7) Slipperiness

Friction coefficient was measured in accordance with ASTM D1894-63 and made an index of slipperiness.

(8) Frosting

Film was coated with a 200 Å thick aluminum layer by vacuum deposition and the frosting was visually observed and rated in three ranks.

O=No frosting observed and very fine surface structure.
Δ=Spots surmised to be owing to coarse particles observed and surface somewhat rough
X=Apparent spots observed and surface rough.

EXAMPLE 1 AND COMPARATIVE EXAMPLE 1

One hundred (100) parts of dimethyl phthalate, 65 parts of ethylene glycol and 0.03 part of calcium acetate monohydrate were placed in a reactor and the mixture was heated. After 4 hours, the temperature reached 230° C. and the transesterification was finished.

Phosphoric acid (0.04 part) and 0.035 part of antimony trioxide were added to the reaction mixture and polymerization was conducted by the usual method. That is, the temperature of the reaction mixture gradually rose and finally reached 280° C. and the pressure gradually lowered until it reached 0.5 mmHg. After 4 hours, a polyethylene terephthalate (A) having an intrinsic viscosity of 0.65 was obtained.

A polyester film having a thickness of 100 μm was obtained. That is, said polymer was extruded through an extrude at 290° C. to form an amorphous sheet and quenched. Thereafter, the sheet was stretched longitudinally and transversally at 110° C. by a factor of 3.2 respectively and subjected to a heat treatment at 210° C. for 5 seconds and thus a biaxially stretched film having a thickness of 100 μm was obtained. The haze of this film was 0.41% and the transparency was good. The dynamic coefficient of friction was so high as 0.90. The film was very difficult to handle.

This is Comparative Example 1.

Separately, 120 parts of deionized water, 0.25 part of potassium persulfate were mixed and a dispersant was added to the mixture. Further, 7 parts of ethylene glycol dimethacrylate, 4 parts of n-butyl acrylate and 1 part of divinylbenzene were added thereto and polymerization was carried out at 70–75% for 6 hours and mono-dispersed cross-linked high polymer particles.

The obtained particles had the r value of 1.2, the average particle diameter of 0.9 μm the particle aspect ratio of 1.04 and the glass transition temperature of 66° C.

A biaxially stretched polyester film was obtained by the same procedures as in the case of polyester (A) except that the polyester (B) contains 200 ppm of the cross-linked high polymer particles. This is Example 1. The deformability of the particles of the obtained film was 1.8. The film was excellent in transparency and slipperiness and free from frosting. The film had a high class impression.

The results are summarized in Table 1 together with the results of other examples.

EXAMPLES 2 AND 3 AND COMPARATIVE EXAMPLES 1-4

Polyester films containing particles not included in the claimed scope or no particles were prepared in accordance with the same procedures as in Example 1 except under the conditions as indicated in Table 1.

EFFECT OF THE INVENTION

The film of the present invention is excellent in transparency, slipperiness, ease in handling and free from frosting and exhibits high performance in the field where transparency is especially required.

TABLE 1

|  | Particles | | | | Polyester Film | | | | |
|---|---|---|---|---|---|---|---|---|---|
|  |  |  |  |  | Particles | Film Characteristics | | | |
|  | Species | Av. dia. (μm) | Sharpness in Γ | Diameter ratio | Content (ppm) | Deform- ability | Transparency (%) | Slipperiness | Wind- ability | Frosting |
| Ex. 1 | Crossed-linked high polymer | 0.0 | 1.2 | 1.04 | 200 | 1.8 | 0.62 | 0.64 | ○ | ○ |
| Ex. 2 | Crossed-linked high polymer | 1.2 | 1.2 | 1.03 | 150 | 2.0 | 0.60 | 0.66 | ○ | ○ |
| Ex. 3 | Crossed-linked high polymer | 1.1 | 1.3 | 1.05 | 250 | 2.8 | 0.78 | 0.60 | ○ | ○ |
| Comp. Ex. 1 | — | — | — | — | — | — | 0.41 | 0.90 | X | ○ |
| Comp. Ex. 2 |  | 2.0 | 1.4 | 1.05 | 300 | 1.2 | 1.6 | 0.46 | ○ | X |
| Comp. Ex. 3 | SiO$_2$ | 1.4 | 1.5 | 1.02 | 300 | 1.0 | 1.5 | 0.45 | ○ | X |
| Comp. Ex. 4 | SiO$_2$ | 0.8 | 1.0 | 1.02 | 50 | 1.0 | 0.82 | 0.82 | X | ○~Δ |
| Comp. Ex. 5 | TiO$_2$ | 0.3 | 1.4 | 1.20 | 200 | 1.0 | 1.1 | 0.75 | Δ~X | Δ~X |

What we claim is:

1. A biaxially stretched polyester film having excellent transparency and slipperiness and having a haze value of not more than 1% as measured on a 100 micron thick film, comprising
   (a) a polyester and
   (b) 50 to 500 ppm based on the weight of the polyester of monodispersed crosslinked polymer particles having a particle size distribution sharpness of 1.4 or less and average particle diameter of between 0.8 and 1.4 microns, wherein the crosslinked polymer particles having aspect ratio 1.0 to 1.1 before the film is stretched and the aspect ratio between 1.2 and 5 after the film is biaxially stretched,
   wherein the polymer particles consist essentially of a copolymer having a glass transition temperature of less than 95° C., wherein the copolymer consists essentially of a copolymer of one or more monovinyl compounds having only one aliphatic unsaturated bond and one or more crosslinker compounds having two or more aliphatic unsaturated bonds.

2. A biaxially stretched film as claimed in claim 1, wherein the aspect ratio after the film is biaxially stretched is 1.3 to 4.

3. A biaxially stretched film as claimed in claim 1, wherein the aspect ratio after the film is biaxially stretched is 1.3 to 3.

4. A biaxially stretched polyester film as claimed in claim 1, wherein the polyester composition comprises not less than 90 mol % of ethylene terephthalate units or ethylene 2,6-naphthalate units.

5. A biaxially stretched polyester film as claimed in claim 4, wherein a phosphorous compound was used during the preparation of the polyester composition.

6. A biaxially stretched polyester film as claimed in claim 5, wherein a manganese or calcium compound was used in combination with the phosphorous compound, wherein the ratio of phosphorous compound to metal compound was 0.6 to 3 moles per 1 mole of the metal compound.

7. A biaxially stretched polyester film as claimed in claim 1, wherein the particle size distribution sharpness is 1.3 or less.

8. A biaxially stretched polyester film as claimed in claim 1, wherein said glass transition temperature is not higher than 85° C.

9. A biaxially stretched polyester film as claimed in claim 1, wherein said glass transition temperature is not higher than 75° C.

10. A biaxially stretched polyester film as claimed in claim 1, wherein the polymer particles comprises 0.5 to 20% by weight of the crosslinker compounds.

11. A biaxially stretched polyester film as claimed in claim 1, having a thickness of 10 to 200 micrometers.

12. A biaxially stretched polyester film as claimed in claim 1, which consists essentially of the polyester and the polymer particles.

13. A biaxially stretched polyester film as claimed in claim 1, containing 100 to 300 ppm of the polymer particles.

14. A biaxially stretched polyester film as claimed in claim 1, wherein the average particle diameter of the particles is 0.9 to 1.3 microns.

15. A biaxially stretched polyester film as claimed in claim 1, which is produced by a method comprising the steps of
   (a) melt-extruding the polyester and the polymer particles into a sheet at 270° to 320° C.,
   (b) cooling the sheet to 40° to 80° C. so as to solidify it as an amorphous sheet,
   (c) sequentially or simultaneously stretching in the longitudinal and transverse directions so as to form a biaxially stretched film.

16. A biaxially stretched polyester film as claimed in claim 1, wherein the polyester consists essentially of polyethylene terephthalate.

17. A biaxially stretched polyester film as claimed in claim 1, wherein the one or more monovinyl compounds having only one aliphatic unsaturated bond are selected from the group consisting of acrylic acid, methacrylic acid, methyl or glycydyl esters of either of these acids, maleic anhydride and alkyl derivatives thereof, vinyl glycidyl ether, vinyl acetate, styrene and alkyl-substituted styrene.

18. A biaxially stretched polyester film as claimed in claim 1, wherein the one or more crosslinker compounds having two or more aliphatic unsaturated bonds is selected from the group consisting of divinyl benzene and divinyl sulfone.

19. A biaxially stretched polyester film as claimed in claim 1, wherein the polyester consists essentially of polyethylene 2,6-naphthalate.

* * * * *